United States Patent
Baciu et al.

(10) Patent No.: US 9,386,154 B2
(45) Date of Patent: Jul. 5, 2016

(54) SYSTEM, METHOD AND SOFTWARE PROGRAM FOR ENABLING COMMUNICATIONS BETWEEN CUSTOMER SERVICE AGENTS AND USERS OF COMMUNICATION DEVICES

(75) Inventors: Assaf Baciu, Berkeley, CA (US); Kevin M. Stone, Mountain View, CA (US); David A. Winarsky, Austin, TX (US)

(73) Assignee: Nuance Communications, Inc., Burlington, MA (US)

( * ) Notice: Subject to any disclaimer, the term of this patent is extended or adjusted under 35 U.S.C. 154(b) by 879 days.

(21) Appl. No.: 12/005,050

(22) Filed: Dec. 21, 2007

(65) Prior Publication Data

US 2009/0164214 A1    Jun. 25, 2009

(51) Int. Cl.
| | |
|---|---|
| G10L 21/00 | (2013.01) |
| G10L 25/00 | (2013.01) |
| G10L 15/00 | (2013.01) |
| H04M 3/51 | (2006.01) |
| G10L 13/00 | (2006.01) |
| G10L 15/26 | (2006.01) |
| H04M 3/53 | (2006.01) |

(52) U.S. Cl.
CPC ............. *H04M 3/5191* (2013.01); *G10L 13/00* (2013.01); *G10L 15/26* (2013.01); *H04M 3/5166* (2013.01); *H04M 3/5322* (2013.01); *H04M 2201/39* (2013.01); *H04M 2201/40* (2013.01); *H04M 2201/60* (2013.01); *H04M 2203/2061* (2013.01)

(58) Field of Classification Search
CPC ....... G10L 15/26; G10L 15/265; G10L 13/00; G10L 13/08; G10L 15/22; G10L 15/30; G10L 17/22; G10L 25/48; G10L 15/00; H04M 1/72519; H04M 2201/40; H04M 3/493; H04M 3/4936; H04M 3/51
See application file for complete search history.

(56) References Cited

U.S. PATENT DOCUMENTS

| | | | |
|---|---|---|---|
| 4,164,025 A | | 8/1979 | Dubnowski et al. |
| 4,697,282 A | * | 9/1987 | Winter et al. .............. 379/88.23 |

(Continued)

FOREIGN PATENT DOCUMENTS

| | | |
|---|---|---|
| EP | 1435720 | 7/2004 |
| GB | 2206265 | 12/1988 |

(Continued)

OTHER PUBLICATIONS

International Search Report in related PCT Application No. PCT/US2008/013893.

(Continued)

*Primary Examiner* — Michael Ortiz Sanchez
(74) *Attorney, Agent, or Firm* — Lessani Law Group, PC

(57) ABSTRACT

The present invention provides a system, method and software application for enabling a customer service agent to efficiently communicate with users of a communication device. When a user enters speech input into his communication device, the speech is converted to text, and the text is displayed to the customer service agent on the agent's computer screen. Alternately, the user's speech input is provided to the customer service agent in the form of an audio file. The agent types a response, and the agent's response is provided to the user on the user's communication device. The agent's response may be converted to speech and played to the user, and/or the agent's response may be displayed as text on the display screen of the user's communication device.

9 Claims, 6 Drawing Sheets

(56) References Cited

U.S. PATENT DOCUMENTS

| | | | |
|---|---|---|---|
| 4,850,007 A | 7/1989 | Marino et al. | |
| 4,918,322 A * | 4/1990 | Winter et al. | 379/67.1 |
| 4,945,557 A | 7/1990 | Kaneuchi et al. | |
| 5,136,636 A | 8/1992 | Wegrzynowicz | |
| 5,386,455 A | 1/1995 | Cooper | |
| 5,553,119 A | 9/1996 | McAllister et al. | |
| 5,638,425 A | 6/1997 | Meador et al. | |
| 5,677,990 A | 10/1997 | Junqua | |
| 5,724,481 A | 3/1998 | Garberg et al. | |
| 5,799,065 A | 8/1998 | Junqua et al. | |
| 5,819,265 A | 10/1998 | Ravin et al. | |
| 5,875,394 A | 2/1999 | Daly et al. | |
| 5,880,770 A | 3/1999 | Ilcisin et al. | |
| 5,946,613 A | 8/1999 | Hayes et al. | |
| 5,991,720 A | 11/1999 | Galler et al. | |
| 5,991,739 A | 11/1999 | Cupps et al. | |
| 6,016,336 A | 1/2000 | Hanson | |
| 6,125,347 A | 9/2000 | Cote et al. | |
| 6,167,383 A | 12/2000 | Henson | |
| 6,173,266 B1 | 1/2001 | Marx et al. | |
| 6,181,927 B1 | 1/2001 | Welling et al. | |
| 6,208,965 B1 | 3/2001 | Brown et al. | |
| 6,216,111 B1 | 4/2001 | Walker et al. | |
| 6,253,174 B1 | 6/2001 | Ishii et al. | |
| 6,314,165 B1 | 11/2001 | Junqua et al. | |
| 6,334,103 B1 | 12/2001 | Surace et al. | |
| 6,363,357 B1 | 3/2002 | Rosenberg et al. | |
| 6,404,876 B1 | 6/2002 | Smith et al. | |
| 6,473,734 B1 | 10/2002 | Dvorak | |
| 6,526,273 B1 | 2/2003 | Link et al. | |
| 6,567,658 B1 | 5/2003 | Van De Graaf | |
| 6,584,180 B2 | 6/2003 | Nemoto | |
| 6,587,558 B2 | 7/2003 | Lo | |
| 6,618,704 B2 * | 9/2003 | Kanevsky et al. | 704/271 |
| 6,650,887 B2 | 11/2003 | McGregor et al. | |
| 6,654,447 B1 | 11/2003 | Dewan | |
| 6,662,163 B1 * | 12/2003 | Albayrak et al. | 704/275 |
| 6,728,353 B1 | 4/2004 | Espejo et al. | |
| 6,731,737 B2 | 5/2004 | Davis | |
| 6,771,761 B1 | 8/2004 | LaPierre | |
| 6,792,102 B2 | 9/2004 | Shires | |
| 6,853,987 B1 | 2/2005 | Cook | |
| 6,856,673 B1 | 2/2005 | Banks et al. | |
| 6,876,728 B2 * | 4/2005 | Kredo et al. | 379/88.17 |
| 6,907,118 B2 | 6/2005 | Henderson et al. | |
| 6,915,112 B1 | 7/2005 | Sutton et al. | |
| 6,917,802 B1 | 7/2005 | Nilsson | |
| 6,941,273 B1 | 9/2005 | Loghmani et al. | |
| 6,985,753 B2 | 1/2006 | Rodriguez et al. | |
| 6,996,531 B2 | 2/2006 | Korall et al. | |
| 7,006,971 B1 | 2/2006 | Stahl et al. | |
| 7,023,979 B1 * | 4/2006 | Wu et al. | 379/265.11 |
| 7,106,851 B2 | 9/2006 | Tang et al. | |
| 7,113,571 B2 | 9/2006 | Matsubara et al. | |
| 7,120,235 B2 | 10/2006 | Altberg et al. | |
| 7,143,037 B1 | 11/2006 | Chestnut | |
| 7,187,761 B2 | 3/2007 | Bookstaff | |
| 7,215,969 B2 | 5/2007 | Benco et al. | |
| 7,353,016 B2 | 4/2008 | Roundtree et al. | |
| 7,424,427 B2 | 9/2008 | Liu et al. | |
| 7,487,095 B2 * | 2/2009 | Hill et al. | 704/275 |
| 7,529,678 B2 | 5/2009 | Kobal | |
| 7,698,140 B2 * | 4/2010 | Bhardwaj et al. | 704/260 |
| 7,724,878 B2 * | 5/2010 | Timmins et al. | 379/88.12 |
| 7,779,408 B1 | 8/2010 | Papineau | |
| 7,783,755 B2 | 8/2010 | Goss et al. | |
| 7,822,414 B2 | 10/2010 | Bender et al. | |
| 7,870,199 B2 * | 1/2011 | Galli | G06F 9/547 709/206 |
| 7,881,703 B2 | 2/2011 | Roundtree et al. | |
| 7,970,118 B2 | 6/2011 | O'Dell, III | |
| 7,996,251 B2 | 8/2011 | Kannan et al. | |
| 8,000,973 B2 * | 8/2011 | Williams et al. | 704/275 |
| 8,081,749 B1 | 12/2011 | Shaffer et al. | |
| 2001/0010714 A1 | 8/2001 | Nemoto | |
| 2001/0011230 A1 | 8/2001 | Morganstein et al. | |
| 2001/0037241 A1 * | 11/2001 | Puri | 705/14 |
| 2001/0039492 A1 | 11/2001 | Nemoto | |
| 2001/0048737 A1 | 12/2001 | Goldberg et al. | |
| 2001/0056359 A1 | 12/2001 | Abreu | |
| 2002/0010000 A1 * | 1/2002 | Chern et al. | 455/517 |
| 2002/0034940 A1 | 3/2002 | Takae et al. | |
| 2002/0044639 A1 | 4/2002 | Shioda et al. | |
| 2002/0065736 A1 | 5/2002 | Willner et al. | |
| 2002/0077833 A1 | 6/2002 | Arons et al. | |
| 2002/0077898 A1 | 6/2002 | Koulouris | |
| 2002/0087323 A1 | 7/2002 | Thomas et al. | |
| 2002/0091726 A1 * | 7/2002 | MacLeod Beck et al. | G06Q 10/06 715/201 |
| 2002/0103641 A1 | 8/2002 | Kuo et al. | |
| 2002/0120582 A1 | 8/2002 | Elston et al. | |
| 2002/0159572 A1 | 10/2002 | Fostick | |
| 2002/0168986 A1 | 11/2002 | Lau et al. | |
| 2002/0169618 A1 | 11/2002 | Caspari | |
| 2002/0177914 A1 * | 11/2002 | Chase | 700/94 |
| 2003/0007464 A1 | 1/2003 | Balani | |
| 2003/0023439 A1 | 1/2003 | Ciurpita et al. | |
| 2003/0050043 A1 | 3/2003 | Ohrstrom et al. | |
| 2003/0061171 A1 | 3/2003 | Gilbert et al. | |
| 2003/0064720 A1 | 4/2003 | Valins et al. | |
| 2003/0130904 A1 | 7/2003 | Katz et al. | |
| 2003/0162561 A1 * | 8/2003 | Johnson et al. | 455/553 |
| 2003/0177009 A1 * | 9/2003 | Odinak et al. | 704/260 |
| 2003/0185359 A1 * | 10/2003 | Moore et al. | 379/114.01 |
| 2003/0204444 A1 | 10/2003 | Van Luchene et al. | |
| 2004/0012501 A1 | 1/2004 | Mazzara et al. | |
| 2004/0019487 A1 * | 1/2004 | Kleindienst et al. | 704/270.1 |
| 2004/0047453 A1 | 3/2004 | Fraser | |
| 2004/0091093 A1 | 5/2004 | Bookstaff | |
| 2004/0102225 A1 | 5/2004 | Furuta et al. | |
| 2004/0111267 A1 | 6/2004 | Jadhav et al. | |
| 2004/0161097 A1 | 8/2004 | Henry | |
| 2004/0162724 A1 * | 8/2004 | Hill et al. | 704/231 |
| 2004/0185833 A1 | 9/2004 | Walden et al. | |
| 2004/0203728 A1 | 10/2004 | Schwinke et al. | |
| 2004/0207508 A1 | 10/2004 | Lin et al. | |
| 2004/0242209 A1 | 12/2004 | Kruis et al. | |
| 2005/0044254 A1 | 2/2005 | Smith | |
| 2005/0074102 A1 | 4/2005 | Altberg et al. | |
| 2005/0131910 A1 | 6/2005 | Yanagisawa | |
| 2005/0147052 A1 | 7/2005 | Wu | |
| 2005/0163296 A1 | 7/2005 | Smith et al. | |
| 2005/0177368 A1 * | 8/2005 | Odinak | 704/246 |
| 2005/0183032 A1 | 8/2005 | Bushey et al. | |
| 2005/0201540 A1 | 9/2005 | Rampey et al. | |
| 2005/0213743 A1 | 9/2005 | Huet et al. | |
| 2005/0222712 A1 | 10/2005 | Orita | |
| 2005/0261990 A1 | 11/2005 | Gocht et al. | |
| 2005/0286691 A1 | 12/2005 | Taylor et al. | |
| 2006/0009218 A1 | 1/2006 | Moss | |
| 2006/0080107 A1 * | 4/2006 | Hill et al. | 704/275 |
| 2006/0098619 A1 | 5/2006 | Nix et al. | |
| 2006/0100851 A1 | 5/2006 | Schonebeck | |
| 2006/0106610 A1 | 5/2006 | Napper | |
| 2006/0126804 A1 | 6/2006 | Lee et al. | |
| 2006/0135215 A1 * | 6/2006 | Chengalvarayan et al. | 455/569.2 |
| 2006/0203989 A1 | 9/2006 | Ollason | |
| 2006/0217113 A1 | 9/2006 | Rao et al. | |
| 2006/0262919 A1 * | 11/2006 | Danson et al. | 379/265.02 |
| 2007/0117584 A1 | 5/2007 | Davis et al. | |
| 2007/0190986 A1 | 8/2007 | Lee | |
| 2007/0280439 A1 * | 12/2007 | Prywes | 379/88.18 |
| 2008/0088440 A1 * | 4/2008 | Palushaj | 340/539.25 |
| 2008/0255851 A1 * | 10/2008 | Ativanichayaphong et al. | 704/275 |
| 2010/0267378 A1 | 10/2010 | Hamabe et al. | |

(56) References Cited

U.S. PATENT DOCUMENTS

FOREIGN PATENT DOCUMENTS

| GB | 2360418 | 9/2001 |
| WO | 0062518 | 10/2000 |
| WO | 03079656 | 9/2003 |
| WO | WO 03/079656 A1 | 9/2003 |

OTHER PUBLICATIONS

Written Opinion of ISA in corresponding PCT Application No. PCT/US2008/013893.

Simoudis, E. (2000). If it's not one channel, then it's another. Bank Marketing, 32(1), 48-50+.

* cited by examiner

SYSTEM, METHOD AND SOFTWARE PROGRAM FOR ENABLING COMMUNICATIONS BETWEEN CUSTOMER SERVICE AGENTS AND USERS OF COMMUNICATION DEVICES

BACKGROUND OF THE INVENTION

1. Field of the Invention

This invention relates generally to telecommunications and, more specifically, to communications between users of communication devices and customer service agents.

2. Description of the Background Art

Most companies need to provide customer care and make customer service agents available to customers. Each time a customer calls a customer service agent and consumes the customer service agent's time, it costs the company money and cuts into profit margins. To reduce these costs, many companies have implemented automated customer care options via Interactive Voice Response (IVR) systems, or self-service customer care options via the web. However, sometimes a user really does need or want to talk to a customer service agent. Therefore, in order to provide users' with adequate customer care and reduce customer care costs, there is a need for a system and method that enables customer service agents to efficiently serve customers.

SUMMARY

The present invention provides a method, system, and software application that enable customer service agents to more efficiently assist customers. Specifically, the present invention enables a customer service agent to simultaneously engage in communication sessions with multiple users.

In one embodiment of the present invention, a user speaks a request, question, or statement into a communication device. The user's speech input is converted to text and the text is sent to a customer service agent. The customer service agent reads the text, and types a response. The customer service agent's text response is played to the customer as speech on the communication device, and the user hears the response on the communication device. The user may also see the response as text on the display screen of his communication device.

In an alternate embodiment, the user's speech input is provided to the customer service agent in the form of an audio file. The customer service agent then listens to the audio file, and types a text response. The response is then provided to the user, either in text form, speech form (by converting the text to speech), or both.

In a further embodiment, the user's speech input is converted to text and the text is sent to a customer service agent. The customer service agent reads the text and records a speech response, which is stored as an audio file. The audio file is then played back to the user.

Since the customer service agent is not talking live on the communication device with a user, the customer service agent can engage in communication sessions with multiple users simultaneously. While one user is digesting a customer service agent's response, the customer service agent can be responding to another user.

DETAILED DESCRIPTION OF THE PREFERRED EMBODIMENTS

Figure 1A:
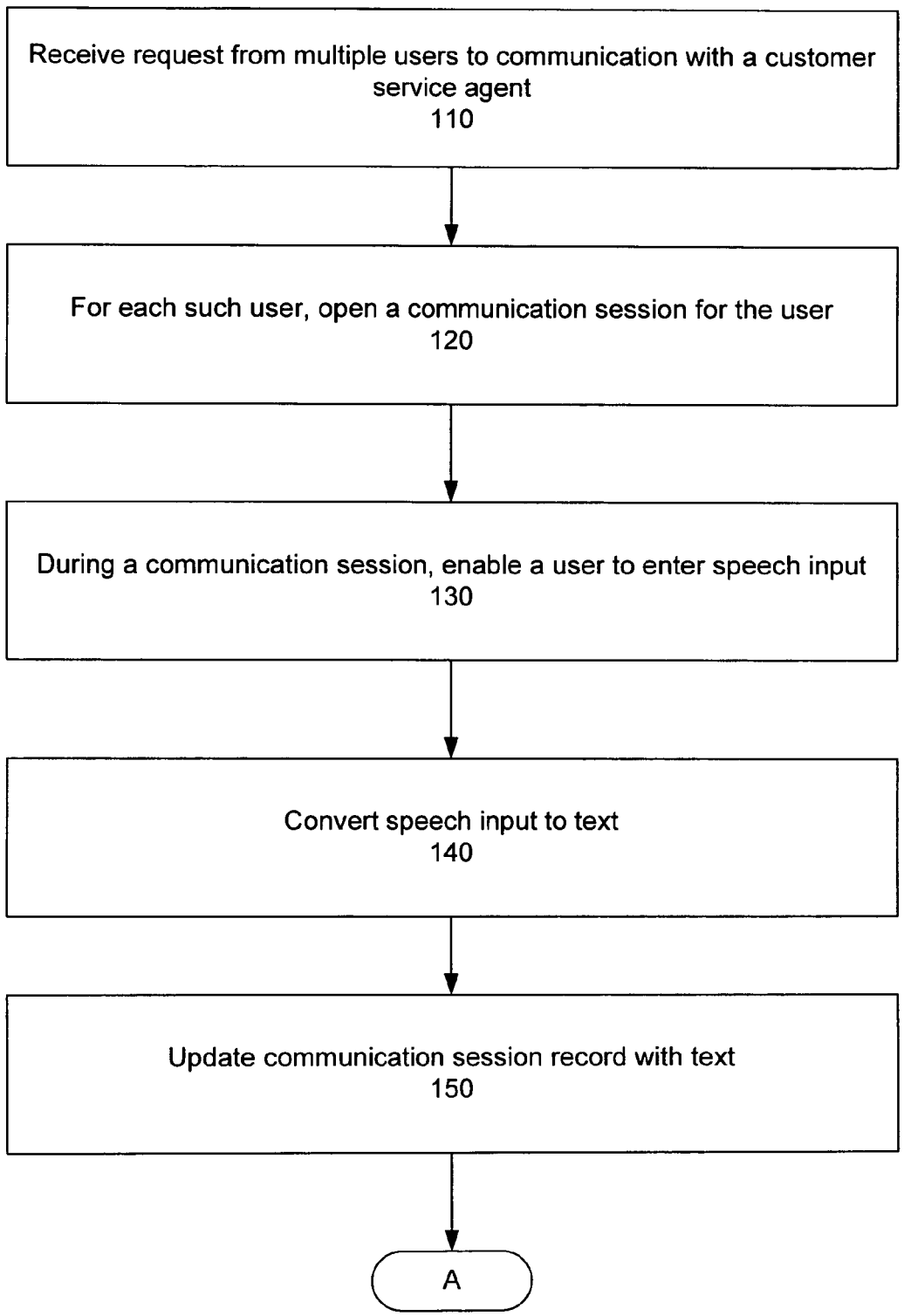
FIGS. 1a-b illustrate a method for enabling users of communication devices to communicate with customer service agents.
Figure 1B:
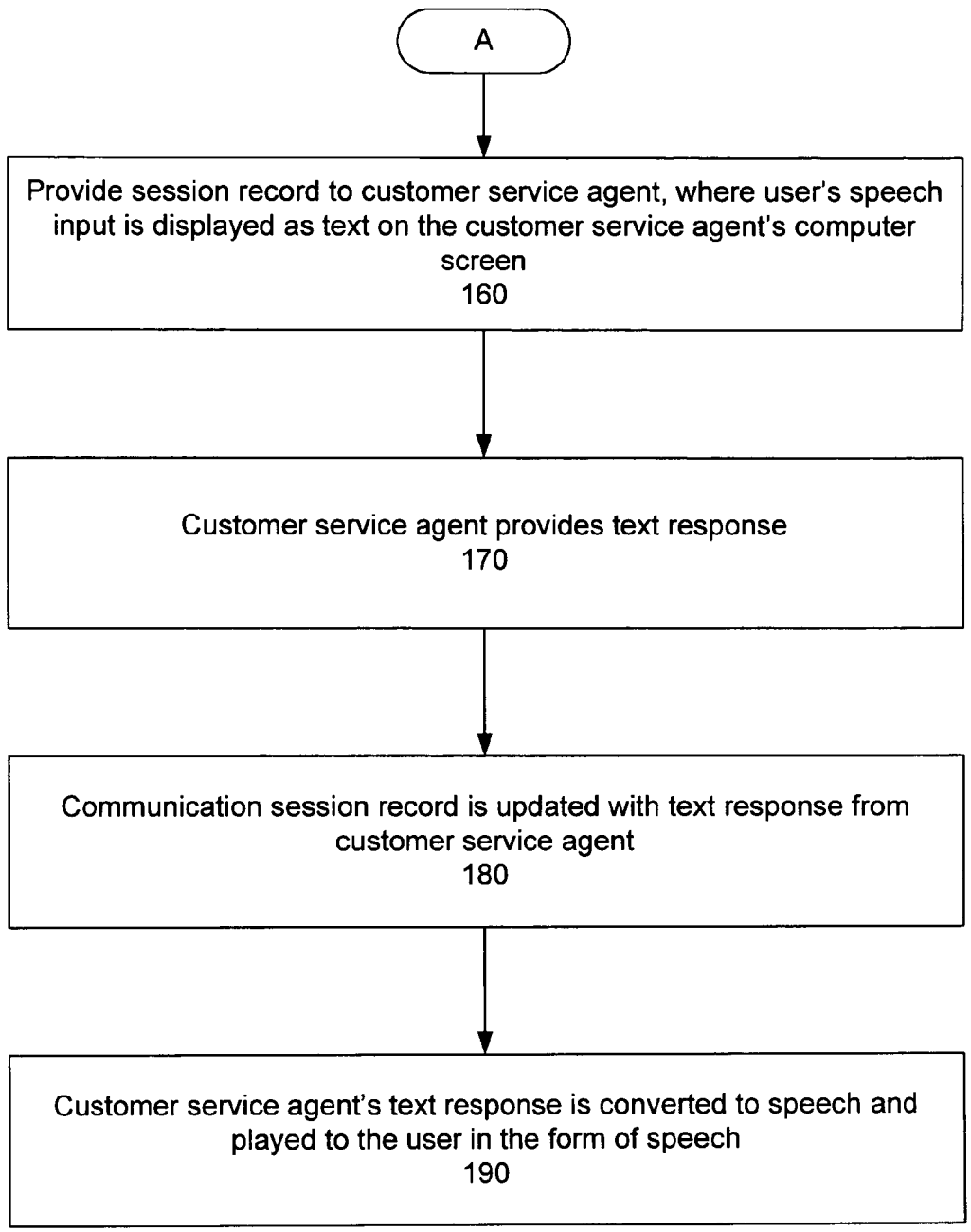

FIGS. 1a-b illustrate a method according to one embodiment of the present invention. A customer service system (such as a server running the Server Application 330 described with respect to FIGS. 3-5) receives requests from multiple users to communicate with a customer service agent (step 110). The request comes from users of communication devices, where each communication device includes a voice interface to the user. In the preferred embodiment, the communication device includes a voice and a visual interface (where text can be displayed in the visual interface). An example of a communication device is a mobile phone. Examples of ways in which a user may initiate a request to speak with a customer service agent include dialing a number on the communication device, pushing a button on the communication device, clicking on a link on the communication device, or speaking certain words into the communication device.

For each eligible user requesting to communicate with a customer service agent, the system opens up a communication session for the user (120). A communication session is a set of related communications between a user and one or more customer service agents. A communication session is associated with a record of the communications between a user and customer service agent(s). When a communication session is open, the record is updated with each communication between the user and the agent.

During a communication session, the system enables the user to enter speech input for a customer service agent (130). The user enters speech input by speaking into his communication device. The speech input is then converted to text (140). The session record is updated with the text (150), and the system provides the customer service agent with the session record, where the user's speech input is displayed as text on the customer service agent's screen (160).

The customer service agent provides a text response (170) (or enters a speech response which is converted to text), and the session is updated with the text response (180). The customer's service agent's text response is converted to speech and played to the user in the form of speech (190). In one embodiment, the user is provided with the customer service agent's response in both speech and text form (e.g., the user hears the customer service agent's response and see the text response in the display screen of his mobile phone). Alternatively, the customer service agent's response is provided to the user only in text form.

In an alternate embodiment, the user's speech input is provided to the customer service agent in the form of an audio file. The customer service agent then listens to the audio file, and types a text response. The response is then provided to the user, either in text form, speech form (by converting the text to speech), or both.

Since the customer service agent is not talking to the user live, the customer service agent can engage in communication sessions with multiple users simultaneously. While one user is digesting a customer service agent's response, the customer service agent can be responding to another user.

During a communication session, a user may communicate with the same customer service agent, or may communicate with multiple customer service agents. In most cases, it will be most efficient for the same customer service agent to service the user during a communication session. However, it is possible for different customer service agents to service the user during a single communication session. For instance, during the same communication session, one customer service agent may respond to a first question spoken by a user, and another customer service agent may respond to a second question from the user. In this way, the invention can "packetize" interactions between users and customer service agents, where one user input/agent response is like a "packet." The system can packetize interactions to load balance and/or to ensure that the user inquiry is routed to a customer service agent best suited to respond to the inquiry (e.g., to provide first- and second-level support to the user). The fact that multiple customer service agents are responding to a user during a communication session may not be apparent to the user (i.e., the user experience may be that he is communicating with the same customer service agent).

Figure 2:
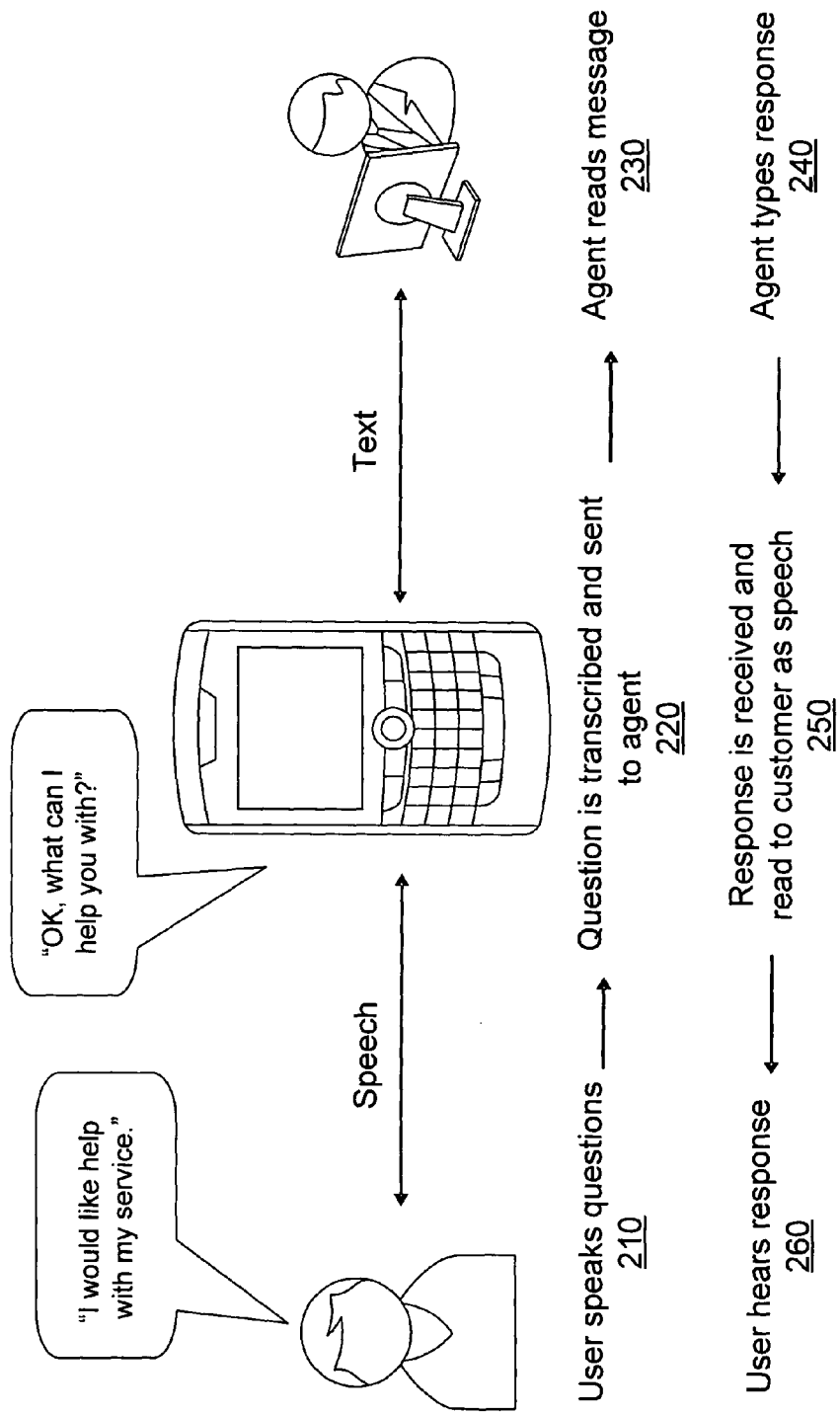
FIG. 2 illustrates an example interaction between a user of a communication device and a customer service agent.

FIG. 2 illustrates an example interaction between a user and a customer service agent. The user speaks a request, question, or statement into his communication device (210). The user's speech input is transcribed to text and the text is sent to a customer service agent (220). The customer service agent reads the text (230), and types a response (240). The customer service agent's text response is read to customer as speech (250), and the user hears the response (260). The user may also see the response as text on the display screen of his communication device. Steps 210-260 are repeated until the user receives the help he needs or otherwise decides to end the communication session. As stated above, during a communication session, multiple customer service agents can assist the user.

Figure 3:
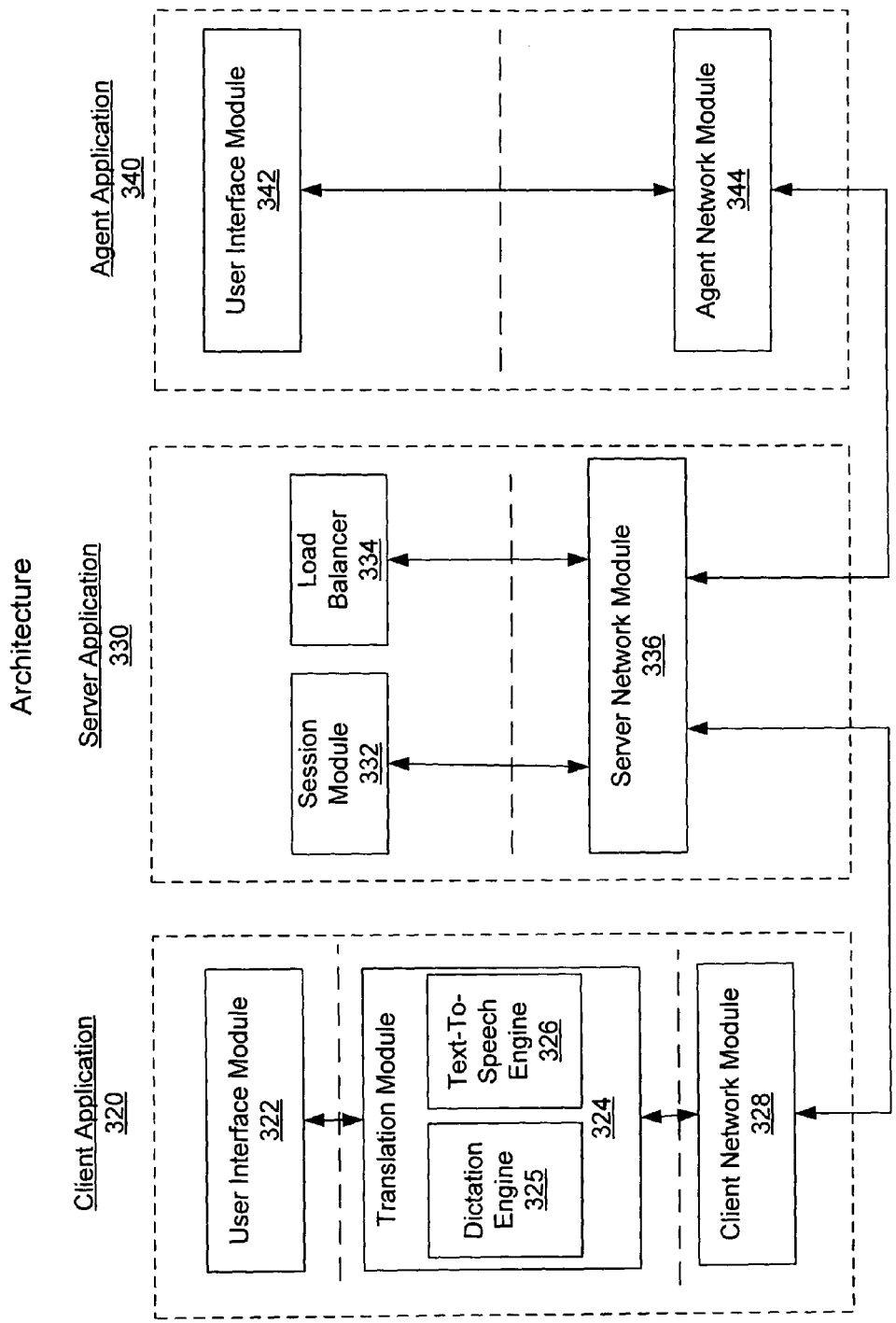
FIG. 3 illustrates an example architecture according to one embodiment of the present invention.

FIG. 3 illustrates an example architecture for implementing one embodiment of the invention. The architecture comprises a Client Application 320 executing on a user's communication device, a Server Application 330 executing on a server, and an Agent Application 340 executing on a customer service agent's computer. The Client Application 320 comprises (1) a Client User Interface Module 322 that provides a voice and visual interface to the user; (2) a Translational Module 324 that converts text to speech and speech to text, and (3) a Network Module 328 that interfaces with a network, such as the Internet, a private network, or a wireless network (such as a mobile phone network). User Interface Modules and Network Modules are well known in the art. An example of a Translational Module is Nuance Communications' Voice to SMS solution that leverages Nuance's Mobile Dictation technology.

The Server Application 330 includes (1) a Session Manager 332 that keeps track of open communication sessions between users and customer service agents; (2) a Load Balancer 334 that allocates an agent to a particular session or communication from a user; and (3) a Server Network Module 336 that interfaces with a network.

The Agent Application 340 on the customer service agent's computer includes (1) a Agent User Interface Module 342 that provides a visual interface to the customer service agent (on the agent's computer screen); and (2) a Client Network Module 328 that interfaces with a network.

Those skilled in the art will appreciate that the user's communication device, the Server, and the customer service agent's computer will include additional functionality not represented by the above Client Application 320, Server Application 330, and Agent Application 340. However, such functionality is well known in the art and a discussion of such functionality is not relevant for an understanding of the invention described herein. Moreover, those skilled in the art will appreciate that there may be many ways to implement the present invention, and the software implementations described herein with respect to FIGS. 3-5 are just examples of implementations.

Figure 4:
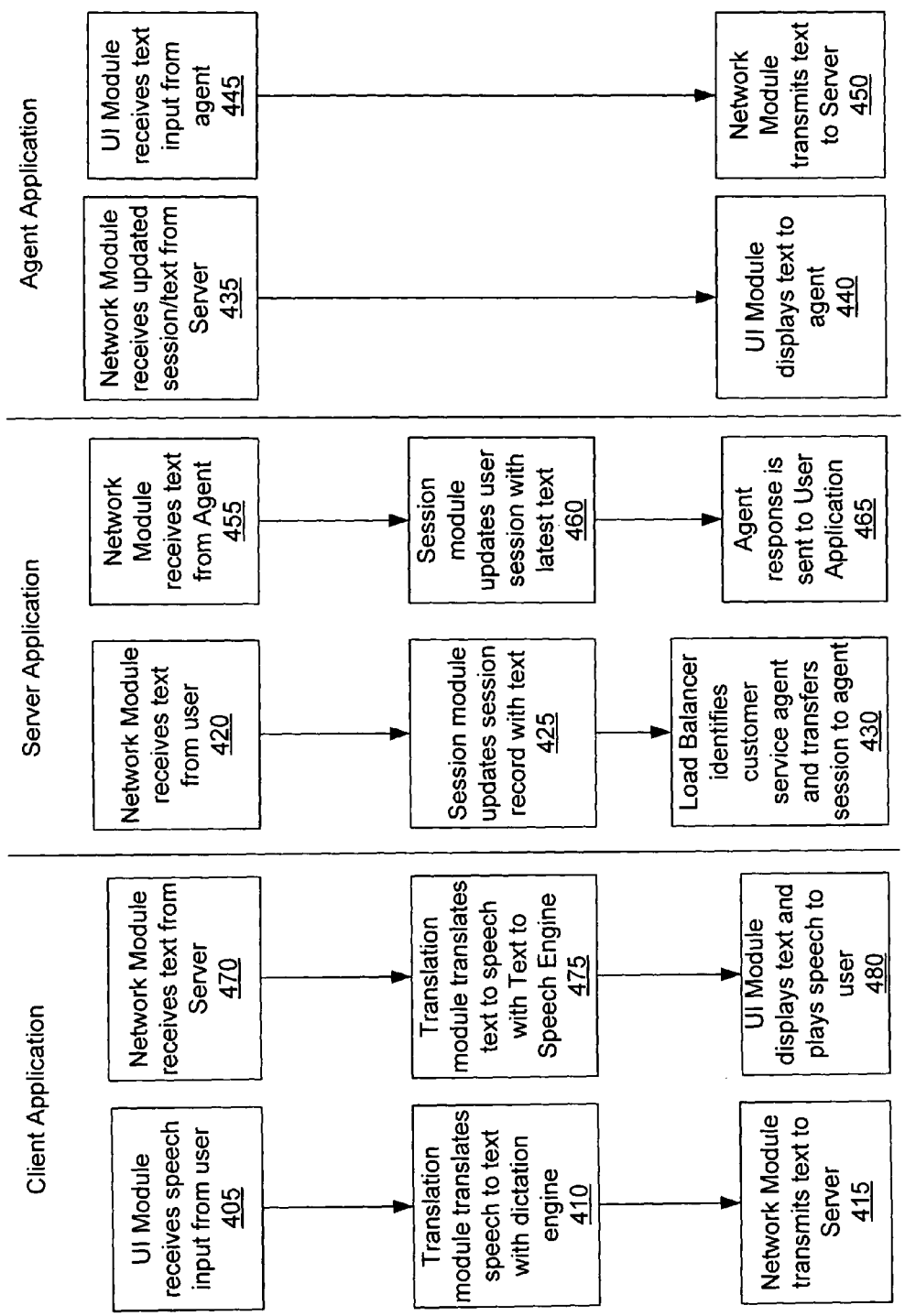
FIGS. 4 is a flow chart that illustrates the operation of the Client Application, Server Application, and Agent Application shown in FIG. 3.
Figure 5:
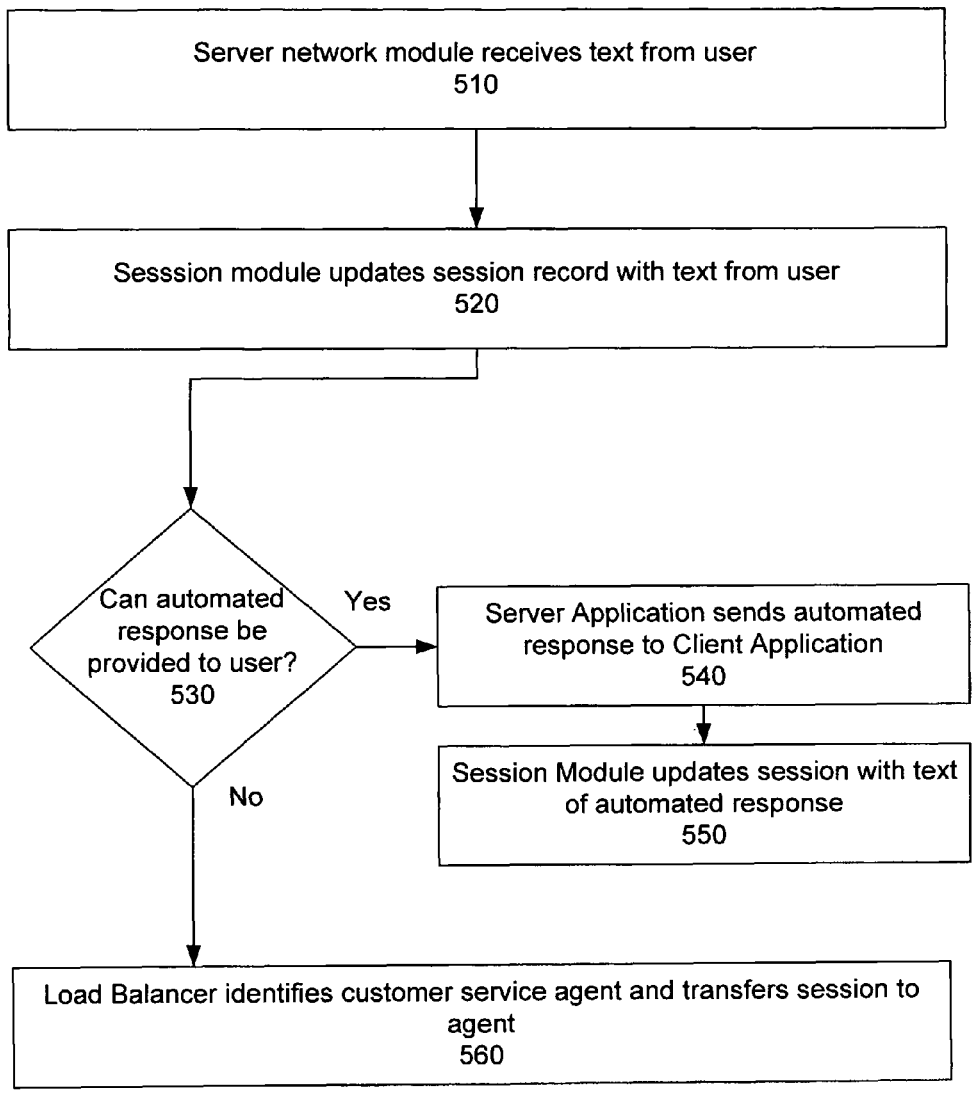
FIG. 5 is a flowchart that illustrates an alternate method of the present invention.

FIG. 4 illustrates how the Client Application 320, Server Application 330, and Agent Application 340 operate according to one example embodiment of the present invention. During a communication session, the Client User Interface Module 322 on the Client Application 320 receives speech input from the user (405). The Translation Module 324 translates the speech to text with the Dictation Engine 325 (410). The Client Network Module 328 then transmits to the text to the Server Application 330 (415).

The Server Network Module 330 receives the text from the Client Network Module 328 (420). The Session Manager 332 on the Server then updates the users communication session with the text (425). This involves determining if an open communication session exists for the user. If an open communication session exists (i.e., the text from the user is part of an ongoing, existing conversation with a customer service agent), the Session Manager 332 updates the existing communication session. If an open communication session does not exist (i.e., the user is initiating a conversation with a customer service agent), the Session Manager 332 opens a new communication session for the user and updates the new session with the text from the user.

The Load Balancer 334 on the Server then identifies an appropriate customer service agent to receive the session and transfer the session record to the customer service agent via the Server Network Module 330 (430). If the communication session is a new communication session, the Load Balancer 334 may use conventional load balancing techniques (e.g., round robin, agent load, etc.) to select an agent. If the communication session is an existing communication session, the Load Balancer 334 may either select the agent that previously handled the session, or it may use conventional load balancing techniques to identify an agent with availability. The Load Balancer 334 may also factor in agent expertise in selecting an agent.

The Agent Network Module 344 receives the communication session record from the server (435), and the Agent User Interface Module 342 displays the contents of the record to the customer service agent in the form of text on the customer service agent's display screen (440).

The customer service agent types a response (or enters a speech response which is converted to text) (445), and the Agent Network Module 344 transmits the text to the server (450). The Server Network Module 336 receives the text from the Agent Application 340 (455), and the Session Manager 332 updates the communication session record with the text (460). The Server Network Module 336 then sends the customer service agent's response (in the form of text) to the user's communication device (465).

The Client Network Module 328 receives the text from the Server Application 330 (470), and the Translation Module 324 translates the text to speech with the Text-to-Speech Engine 326 (475). The Client User Interface Module 322 displays the text and plays the speech to the user (480). Steps 405-480 are repeated until the user or the customer agent terminates the communication session.

In an alternate embodiment of the invention, the Server Application 330 determines whether an automated response can be provided to the user prior to sending a user's session record to a customer service agent. FIG. 5 illustrates how the Server Application 330 handles speech input from the Client Application 320 in this embodiment. The Server Network Module 330 receives the speech input from the user in the form of text (510). The Session Manager 332 updates the session record with the text (520). The Server Application 330 then determines if an automated response can be provided to the user (530). If an automated response can be provided to the user, the Server Application 330 sends an automated response to the user, where the automated response is played to the user as speech or displayed as text in the user interface of the user's communication device (or both) (540). The Session Manager 332 then updates the user's communication session record with the automated response (550). If an automated response cannot be sent to the user, user's communication session record is sent to the Agent Application 340, as described with respect to step 430 in FIG. 4 (560).

In the embodiment described with respect to FIGS. 3-5, the speech to text conversion and the text to speech conversion are performed by the Client Application 320, but the Server Application 330 could perform such functionality instead.

In an alternate embodiment, in addition to or instead of receiving text of the user's speech input, a customer service agent can receive an audio file (e.g., a .wav file) of the user's speech input. The audio file enables the customer service agent to listen to the user's speech input if desired by the customer service agent. For example, in the method described with respect to FIGS. 1a-b, the session record provided to the customer service agent in step 160 could include a .wav file (or other audio file) with a recording of the user's speech input. Such audio file could be in addition to a text transcript or in lieu of a text transcript of the user's speech input in the session record.

In a further alternate embodiment, a user's speech input is converted to text and then provided to a customer service agent. The customer service agent reads the text input and then records a speech response, which is saved as an audio file. The audio file is then sent to the user's phone and played back to the user. A text transcript of the agent's speech response may optionally be provided to the user. Also, the agent's speech response may optionally be converted to text for the purpose of having a text transcript of the agent's response in the session record.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for enabling communication between a user of a mobile communication device and a customer service agent, the method comprising:
    receiving speech input on a mobile communication device from a user for a customer service agent;
    determining automatically by means of a server application executing on a server, independent of agent availability, whether an automated response can be provided to the user;
    in response to determining automatically by means of a server application executing on a server, independent of agent availability, that an automated response can be provided to the user, sending from the server application an automated response to the user;
    in response to determining automatically by means of a server application executing on a server, independent of agent availability, that an automated response cannot be provided to the user, performing the following:
        converting the speech input into text on the mobile communication device;
        determining if an open communication session exists for the user, wherein:
            if an open communication session exists, updating the open communication session with the text from the user and identifying and selecting the customer service agent that previously handled the open communication session, and
            if an open communication session does not exist, opening a new communication session for the user, updating the new communication session with the text from the user, and identifying and selecting the customer service agent based at least in part on the expertise of the customer service agent;
        recording a speech response from the customer service agent in an audio file during the open communication session, wherein the audio file includes the customer service agent's entire recorded response;
        sending the audio file to the user's mobile communication device during the open communication session; and
        playing the customer service agent's speech response to the user during the open communication session, wherein in addition to playing the speech to the user, converting the audio file into text on the mobile communication device, displaying the text from the customer service agent to the user on the user's mobile communication device, and updating the open communication session with the text from the customer service agent.

2. A method for enabling a customer service agent to engage in simultaneous communication sessions with a plurality of users, wherein each user is using a mobile communication device, the method comprising:
    receiving a plurality of requests to open a communication session with a customer service agent, wherein each request comes from a different user desiring to communicate with a customer service agent;
    for each eligible user requesting to open a communication session with a customer service agent:
        determining automatically by means of a server application executing on a server, independent of agent availability, whether an automated response can be provided to the user;
        in response to determining automatically by means of a server application executing on a server, independent of agent availability, that an automated response can be provided to the user, sending from the server application an automated response to the user;
        in response to determining automatically by means of a server application executing on a server, independent of agent availability, that an automated response cannot be provided to the user, performing the following:
            determining if an open communication session exists for the user, wherein if an open communication session exists, updating the open communication session with the text from the user and wherein if an open communication session does not exist, opening a new communication session for the user and updating the new communication session with the text from the user, identifying and selecting a customer service agent that is available to engage in the communication session with the user based at least in part on agent expertise, wherein a single customer service agent may engage in multiple communication sessions simultaneously and wherein multiple customer service agents may be identified and selected to engage the user in an open communication session;

during each communication session between a user and a customer service agent, enabling the user to enter speech input for the customer service agent, wherein the speech is then converted to text on the mobile communication device and provided to the customer service agent in the form of text; and during each communication session between a user and a customer service agent, recording a speech response from the customer service agent in an audio file during the open communication session, wherein the audio file includes the customer service agent's entire recorded response, sending the audio file to the user's mobile communication device during the open communication session, and playing the customer service agent's speech response to the user during the open communication session, wherein in addition to playing the speech to the user, converting the audio file into text on the mobile communication device, displaying the text from the customer service agent to the user on the user's mobile communication device, and updating the open communication session with the text from the customer service agent.

3. A method for enabling communication between a user of a mobile communication device and a customer service agent, the method comprising:

receiving speech input on a mobile communication device from a user for a customer service agent;

determining automatically by means of a server application executing on a server, independent of agent availability, whether an automated response can be provided to the user;

in response to determining automatically by means of a server application executing on a server, independent of agent availability, that an automated response can be provided to the user, sending from the server application an automated response to the user;

in response to determining automatically by means of a server application executing on a server, independent of agent availability, that an automated response cannot be provided to the user, performing the following:

converting the speech input into text on the mobile communication device;

determining if an open communication session exists for the user, wherein:

if an open communication session exists, updating the open communication session with the text from the user and identifying and selecting either the customer service agent that previously handled the open communication session or another customer service agent based on conventional load balancing techniques, and if an open communication session does not exist, opening a new communication session for the user, updating the new communication session with the text from the user, and identifying and selecting the customer service agent based on conventional load balancing techniques, wherein the load balancing techniques factor in agent expertise;

recording a speech response from the customer service agent in an audio file during the open communication session, wherein the audio file includes the customer service agent's entire recorded response;

sending the audio file to the user's mobile communication device during the open communication session; and playing the customer service agent's speech response to the user during the open communication session, wherein in addition to playing the speech to the user, converting the audio file into text on the mobile communication device, displaying the text from the customer service agent to the user on the user's mobile communication device, and updating the open communication session with the text from the customer service agent.

4. The method of claim 3, wherein the automated response is provided to the user in the form of speech.

5. The method of claim 3, wherein the automated response is provided to the user in the form of text.

6. The method of claim 3, wherein the automated response is provided to the user in the form of text and speech.

7. A computer-readable medium having computer-executable instructions for performing a method for enabling a customer service agent to engage in simultaneous communication sessions with a plurality of users, wherein each user is using a mobile communication device, the method comprising:

receiving a plurality of requests to open a communication session with a customer service agent, wherein each request comes from a different user desiring to communicate with a customer service agent;

for each eligible user requesting to open a communication session with a customer service agent:

determining automatically by means of a server application executing on a server, independent of agent availability, whether an automated response can be provided to the user;

in response to determining automatically by means of a server application executing on a server, independent of agent availability, that an automated response can be provided to the user, sending from the server application an automated response to the user;

in response to determining automatically by means of a server application executing on a server, independent of agent availability, that an automated response cannot be provided to the user, performing the following:

determining if an open communication session exists for the user, wherein if an open communication session exists, updating the open communication session with the text from the user and wherein if an open communication session does not exist, opening a new communication session for the user and updating the new communication session with the text from the user, identifying and selecting a customer service agent that is available to engage in the communication session with the user based at least in part on agent expertise, wherein a single customer service agent may engage in multiple communication sessions simultaneously and wherein multiple customer service agents may be identified and selected to engage the user in an open communication session;

during each communication session between a user and a customer service agent, enabling the user to enter speech input for the customer service agent, wherein the speech is then converted to text on the mobile communication device and provided to the customer service agent in the form of text; and during each communication session between a user and a customer service agent, recording a speech response from the customer service agent in an audio file during the open communication session, wherein the audio file includes the customer service agent's entire recorded response, sending the audio file to the user's mobile communication device during the open communication session, and playing the customer service agent's speech response to the user during the open communication session, wherein in addition to playing the speech to the user, converting the audio file into text on the mobile communication device, displaying the text from the customer service agent to the user on the user's mobile communication device, and updating the open communication session with the text from the customer service agent.

8. The computer-readable medium of claim 7, further comprising also providing the customer service agent with an audio file of the user's speech input.

9. A method for enabling communication between a user of a mobile communication device and a customer service agent, the method comprising:

receiving speech input on the mobile communication device from the user for the customer service agent, wherein the customer service agent is selected in part based on the agent's expertise;

determining automatically by means of a server application executing on a server, independent of agent availability, whether an automated response can be provided to the user;

in response to determining automatically by means of a server application executing on a server, independent of agent availability, that an automated response can be provided to the user, sending from the server application an automated response to the user;

in response to determining automatically by means of a server application executing on a server, independent of agent availability, that an automated response cannot be provided to the user, performing the following:

converting the speech input into text on the mobile communication device;

providing the text to the customer service agent;

recording a speech response from the customer service agent in an audio file during an open communication session, wherein the audio file includes the customer service agent's entire recorded response;

sending the audio file to the user's mobile communication device during the open communication session; and playing the customer service agent's speech response to the user during the open communication session, wherein in addition to playing the speech to the user, converting the audio file into text on the mobile communication device, displaying the text from the customer service agent to the user on the user's mobile communication device, and updating the open communication session with the text from the customer service agent.

* * * * *